Patented Mar. 24, 1942

2,277,038

UNITED STATES PATENT OFFICE 2,277,038

ANESTHETIC PREPARATION

David Curtis, New York, N. Y.

No Drawing. Application October 30, 1937,
Serial No. 171,992

10 Claims. (Cl. 167—52)

The present invention relates to improvements in anesthetic preparations intended for use both as local and surface anesthetics, and more particularly to anesthetic preparations containing a mixture of two or more anesthetic salts having different pH values in solution, whereby the pH value of the combined mixture in solution may be adjusted as desired, by adjusting the proportions of the respective salts, thereby obtaining a higher degree of stability for the solution.

It is a further object of the present invention to provide anesthetic solutions, or dry or concentrated liquid base preparations therefor, which contain among the anesthetic salts of the mixture at least one anesthetic salt of a relatively higher pH value, from substantially neutral (methyl red) and upward through the alkaline range, thereby obtaining the enhanced anesthetic value of such salt in the solution, and at least one salt of a relatively lower pH value, in the requisite proportions to obtain a lowered pH value for the solution, with the consequent increased stability.

It is another object of the present invention to provide anesthetic preparations of the character described, containing a mixture of anesthetic salts of varying pH values, wherein the pH value of the mixture in solution, and the consequent relative stability of the solution, may be approximately predetermined by varying the proportions of the anesthetic salts entering into the mixture, and in which the use of free acid usually employed for the purpose and which is ordinarily undesirable, may be substantially eliminated.

It is still another object of the present invention to provide anesthetic solutions or preparations for solutions of the character described in which epinephrine or other vaso-constricting substances will not easily deteriorate and in which the anesthetic base itself will not readily decompose or split up on standing.

It is a still further object of the present invention to provide, in particular, substantially and relatively stable solutions and base mixtures for stable solutions of procaine borate and of condensation salts of procaine borate and of similar anesthetic salts of relatively high alkaline reaction solution, and to devise methods for preparing such solutions.

It is definitely established that solutions of anesthetic salts that have a pH approaching the neutral (methyl red) or a higher alkaline point, decompose much more rapidly than similar solutions whose pH value tends toward the acid side. In the former type of solution there is a tendency toward the breaking up of the anesthetic ester radicle itself as well as, in some cases, to detach it from its associated acid radicle. Also, easily oxidizable vaso-constrictors, such as epinephrine and others, which are frequently used in anesthetic solutions, tend to discolor much more readily in the former type of solution. Indeed, it has been found that the minute quantities of alkalis derived, sometimes, from a glass container, may be sufficient to affect adversely the stability of the vaso-constrictor in the solution.

On the other hand, anesthetic salts having a pH value tending toward alkalinity have been found to have relatively greater anesthetic potency, especially in surface anesthesia, and to promote a more rapid onset of anesthesia. As an illustration of that fact, we may take procaine borate, in any of its various forms, which has a very high pH value in solution, 8.2, and which is one of the best known substances for surface anesthesia for mucous tissue. Procaine borate, however, is known to decompose in solution within a few days after preparation, and to decompose epinephrine within a few hours.

Heretofore, anesthetic preparations were made of anesthetic salts that were themselves acid in reaction, such as procaine hydrochloride, with or without the addition of an acid, or, in very few instances, of alkaline anesthetic salts to the solution of which free acid was added to obtain stability for a limited time only. Such anesthetic preparations, therefore, either did not have the advantage of the possible higher potency obtainable with alkaline anesthetics or did not have the desired and more advantageous enhanced stability, and contained, usually free, uncombined acid, which is always undesirable and sometimes harmful. The presence of free, uncombined acid tends to delay the onset of anesthesia, and when used in reasonable amounts, will not be effective in preventing the decomposition of some of the more highly alkaline anesthetic salts, such as procaine borate, for instance.

I have found that I can obtain solutions containing anesthetic salts of a relatively higher pH value of an enhanced stability by incorporating into the same solutions therewith one or more other anesthetic salts of a relatively lower pH value. I can thus obtain anesthetic preparations of relatively higher anesthetic potency, due to the presence therein of anesthetic salts of relatively higher pH value, and of relatively substantial stability, because of the presence of the anesthetic salts of relatively lower pH value, and that I can, within certain limits, control the stability of such preparations in solution to the desired point, by controlling the pH value thereof, which may be accomplished by varying the relative proportions of the two types of anesthetic salts present therein.

It may readily be understood that the potency and stability of the preparations of the present invention and of their solutions may be determined and adjusted in accordance with the purposes to which they are to be applied and with the manner in which they are to be put up and used.

Preparations for anesthetic solutions that are put up in powder form, to be dissolved immediately prior to use and the solutions consumed within a short time thereafter require a lesser amount of the anesthetic salts of the lower pH range, because the degree of stability necessary is limited. Similarly, preparations for surface anesthesia, which usually require a higher anesthetic potency, may be prepared with a greater proportion of the salts having the relatively higher pH value. Preparations or solutions to be used for local anesthesia, especially solutions put up for commercial distribution, and which may have to stand up for considerable lengths of time before being used, and therefore require longer stability may be preferably made with a relatively greater proportion of the salts of the group having a relatively lower pH value, preferably employing salts having an appreciably acid reaction in solution, and in proportion sufficient to give the final solution an acid reaction.

As members of the higher pH value group of anesthetic salts that may be used, we may take any salt of an anesthetic base that has, in solution, a pH value from neutrality (methyl red) and upward through the alkaline range. Such salts include among their number neutral and alkaline salts of esters of amino aromatic acids, such as benzoic and cinnamic acid, within such limitations as may be imposed by the intended use. Thus, where use by injection for local anesthesia is contemplated, the salt chosen must be a soluble salt, preferably one soluble in water, such as the salts of procaine and butyne, the former of which will hereinafter be most frequently referred to in the illustrative examples because of its prevalent use.

This class of substances includes, specifically, among others too numerous to mention, di-procaine-tartrate (pH 6.3), di-procaine-malate, tri-procaine-citrate (pH 6.7–6.9), the various forms of procaine-borate containing from 49% to 51% of procaine base (pH 8.2–8.3), di-butyl-trate, di-butyl malate, di-butyl-citrate and similar soluble salts of alkamine and alkyl esters of amino-aromatic acids, such as salts of di-ethyl-amino-propyl-p-amino-benzoate and cinnamate, di-propyl-amino - propanol - p - amino benzoate and cinnamate and dipropyl-amino-ethanol-p-amino-benzoate and cinnamate.

An important series of salts within the above higher pH value group consists of the salts which are the product of the chemical combination of procaine base with the condensation products of boric acid with other acids, such as benzo-boric acid (1 boric:benzoic acid), boro-citric acid (1 boric : 3 citric acid), boro-salicylic acid (1 boric : 2 salicylic acid), potassium-boro-tartrate (two of several forms, one made from 2 borax to 5 potassium-hydrogen tartrate, and another made from boric acid and potassium-hydrogen-tartrate and having the approximate formula of $KBOC_4H_4O_6$). The salts of this group have an alkaline reaction, some of them, as the last one, having a pH value of 8.3 (cresol red indicator).

Included in the second type of anesthetic salts, among those of the relatively lower pH group, may be all anesthetic salts having a pH within the acid range. It may include the lesser acid substances, such as the hydrochlorides, the sulphates, the phosphates of anesthetic bases, and the like. The preferred salts of this type are, however, the group of appreciably acid salts, because the desired pH may be obtained with a relatively lesser proportion of these salts. Such preferred group included the acid or unsaturated salts of anesthetic bases, such as the acid sulphate, the acid phosphate, the acid tartrate, the acid citrate and the corresponding sodium and potassium acid salts of these acids. The most desirable salts within this group are the unsaturated organic acid salts of the anesthetic bases, such as the mono-procaine-citrate, the di-procaine citrate, the mono-procaine-tartrate, sodium and potassium procaine citrate and tartrate, respectively, mono-procaine-malate and the sodium and potassium salts thereof. This type of salt also includes procaine acetyl-salicylate (an amber balsamic substance) and butyn acetyl-salicylate and other similar salts; also the benzocaine salts.

I have prepared, in accordance with my invention, a great variety of anesthetic preparations, using numerous different anesthetic salts, in numerous proportional variations to obtain a variety of results in the way of potency and stability and applicability in use. Among the numerous preparations made by me are included the following examples.

Example 1.—A 2% solution made from 0.9 gram of tri-procaine citrate, 0.9 gram of di-procaine malate and 0.2 gram of mono-procaine citrate. This solution has a pH of 5.0–5.2, and with the addition of the proper proportions of (3 cc. of a 1:1000 solution) is suitable for local anesthesia, and remains stable for a few days.

Example 2.—A 2% solution made from 10% of sodium-procaine-tartrate, 45% tri-procaine citrate and 45% of di-procaine citrate. It has a pH of 6.6 and is suitable for injection purposes.

Example 3.—A 2% solution made of 90% of di-procaine tartrate and 10% of sodium-procaine-tartrate. This solution with a pH of 5.8, is also suitable for injection purposes.

Example 4.—A 2% solution made from equal proprotions of mono-procaine citrate and tri-procaine citrate. The pH of this solution is 4.8–4.9 and it is suitable, also, for injection purposes.

Example 5.—A 2% solution of procaine borate and mono-procaine tartrate in which each of the salts supplies an equal proportion of the procaine base. Such solution has a pH of 4.4–4.5, and with the proper amounts of a vaso-constrictor and anti-oxidants, has stability for several months. I obtain the procaine-borate in solution by dissolving equal parts of procaine base and boric acid in hot water, and stir to complete solution. Similarly, I obtain procaine salts of the acids and acid substances enumerated by dissolving procaine base and the acid body in proper amounts in hot water by stirring to complete solution.

Example 6.—A solution of procaine borate and mono-procaine tartrate containing 2% by weight of each salt. It gives a pH of 7.0 to 7.1, is alkaline to litmus and is highly useful for both local and topical anesthesia. It will remain stable for a period longer than a solution of procaine borate of equal concentration adjusted to the same pH by free acid.

*Example 7.*—A solution containing per each 100 cc. procaine borate in amount to supply 1.5 grams of procaine base and mono-procaine citrate containing 0.5 gram of base. This solution has a pH of 7.0 to 7.1 (brom-thymol blue) suitable for injection and as a topical anesthetic.

*Example 8.*—A solution containing per each 100 cc. 1.0 gram of procaine base as procaine borate and 1.0 gram of procaine base as di-procaine citrate. It has a pH of 7.4 to 7.5 and is substantially stable. It is suitable for local and topical use.

*Example 9.*—A mixture of 0.7 gram tri-procaine citrate and 0.7 gram of di-procaine citrate and 0.7 gm. mono-procaine citrate to each 100 cc. of water. The solution is slightly acid to litmus, having a pH of 4.6–4.7. When 3 cc. of epinephrine solution, 1:1000 is added, without any preservative, the solution will remain colorless and clear for more than three days.

*Example 10.*—A mixture of 0.9 gram of di-procaine citrate plus 0.2 gram of mono-procaine citrate plus 0.9 gram of tri-procaine citrate on 100 cc. of water. The solution has a pH of 5.0–5.2, is acid to litmus, plus 3 cc. of epinephrine solution (1:1000). No discoloration takes place for more than three days, without any preservative.

*Example 11.*—A mixture of 0.7 gram of tri-procaine citrate, plus 0.7 gram of di-procaine malate plus 0.7 gram of di-procaine citrate per each 100 cc. of water gives a solution which has a pH of 5.8, acid to litmus. When 3 cc. of epinephrine solution (1:1000) is added it will remain clear for more than three days, without any preservative.

*Example 12.*—A mixture of 0.7 gram of tri-procaine citrate, plus 0.7 gram of di-procaine citrate, plus 0.7 gram of procaine-potassium-tartrate in each 100 cc. of water, forms a solution having a pH of 5.6 which also remains clear for more than 3 days in presence of epinephrine and without preservatives. (The procaine-potassium-tartrate formed from equimolecular combination of potassium acid tartrate and procaine base on heating together in water and stirring becomes a soluble salt, although the potassium acid tartrate and procaine base are by themselves substantially insoluble in water.)

In making up preparations of the above ingredients either in solution form or in dry or liquid base mixtures ready for solution, I may incorporate in addition to physiological salt a vaso-constrictor which may include, generally, salts of epinephrine or substitutes for epinephrine, such as the hydrochloride, the tartrate the citrate and malate and gluconate of epinephrine; also epinephrine linked to benzaldehyde sulphite or benzaldehyde sodium acid sulphite, and similar vaso-constrictive salts, such as 3:4 dihydroxyphenyl methyl-ethyl amine; phenyl-methyl-amino-propanol (synthetic or natural); mono-hydroxy-phenyl-methyl-ethyl amine; mono-hydroxy phenyl-methyl-ethanol amine; mono-hydroxyphenyl-methyl propanol amine; phenyl-amino-propanol; phenyl-methyl-ethanol amine; 3:4 di-hydroxy-phenyl-amino-propanol; 3:4 dihydroxy phenyl-methyl-amino propanol and other similar suitable compounds.

As anti-oxidants I may use singly or in combination sodium thiosulphate, sodium sulphite, sodium bisulphite, acetone sodium bisulphite, benzaldehyde sulphite and benzaldehyde sodium bisulphite, between 0.1% to 0.2% of the final complete solution. Or I may use a mixture containing 0.15% sodium thiosulphate and from 0.07% to 0.1% of any other sulphite, or bisulphite enumerated above. For external purposes the amount of the preservative may be increased 2 to 3 times the amount or more.

The solutions prepared in accordance with the present invention vary in their range of stability from a few days to a number of months. In the latter case, of course, the solutions are adjusted with the appropriate anti-oxidants and reducing agents. However, I have found that the stability of such salts as the procaine-borates, in solution, although adjusted with similar anti-oxidants and even adjusted to a pH value within the acid range through the addition of acid substances did not retain the same degree of stability and retention of potency to any extent such as achieved through the method of the present invention as outlined above.

When using the local anesthetics containing procaine in combination with fruit acids in the various proportions to get a solution with a slightly acid reaction it was possible to get stability and freedom from discoloration of the solution for a few days without the addition of a reducing agent, the presence of which may be objectionable in some instances.

This completes the description of the solutions and methods of the present invention. It is to be understood that I do not wish to be limited to the embodiments and examples of my invention as set forth herein because many variations therein may be made in accordance with the principles of my invention, within the spirit and scope of the same and of the claims hereto appended.

What I claim is:

1. The method for conferring a predetermined stability upon a solution containing procaine borate which comprises the steps of dissolving procaine base and boric acid, in equal amounts by weight, in hot water to complete solution, separately dissolving procaine base and an acid, in proportion to form an unsaturated salt having a pH value within the range of acidity and bringing the two solutions together.

2. An anesthetic preparation comprising essentially procaine borate and as an agent for increasing the stability thereof, at least one acid-reacting acid anesthetic salt of a polybasic acid.

3. An anesthetic preparation comprising essentially procaine borate and as an agent for increasing the stability thereof, at least one acid-reacting acid anesthetic salt of a polybasic organic hydroxy acid.

4. An anesthetic preparation comprising essentially procaine borate and as an angent for increasing the stability thereof, at least one acid-reacting acid anesthetic salt of a polybasic polyhydroxy organic acid.

5. An anesthetic preparation comprising essentially procaine borate and as an agent for increasing the stability thereof, at least one acid-reacting procaine acid salt of a polybasic acid.

6. An anesthetic preparation comprising essentially procaine borate and as an agent for increasing the stability thereof, at least one acid-reacting procaine acid salt of a polybasic organic hydroxy acid.

7. An anesthetic preparation comprising essentially procaine borate and as an agent for increasing the stability thereof, at least one acid-reacting procaine acid salt of a polybasic polyhydroxy organic acid.

8. An anesthetic preparation comprising essentially procaine borate and as an agent for increasing the stability thereof mono-procaine tartate.

9. An anesthetic preparation comprising essentially procaine borate and as an agent for increasing the stability thereof, at least one acid-reacting acid anesthetic salt of a polybasic organic hydroxy acid, in which at least 50% of the anesthetic base present is supplied by the procaine borate.

10. An anesthetic preparation comprising essentially procaine borate and as an agent for increasing the stability thereof, at least one acid-reacting acid anesthetic salt of a polybasic organic hydroxy acid, in which between 50% and 75% of the anesthetic base present is supplied by the procaine borate.

DAVID CURTIS.

CERTIFICATE OF CORRECTION.

Patent No. 2,277,038.  March 24, 1942.

DAVID CURTIS.

It is hereby certified that error appears in the printed specification of the above numbered patent requiring correction as follows: Page 2, first column, line 55, for "trate" read --tartrate--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patents.